United States Patent [19]

Krutak, Sr.

[11] 3,865,837

[45] Feb. 11, 1975

[54] PROCESS FOR PREPARING FISCHER'S BASE

[75] Inventor: James J. Krutak, Sr., Kingsport, Tenn.

[73] Assignee: Eastman Kodak Company, Rochester, N.Y.

[22] Filed: Aug. 21, 1973

[21] Appl. No.: 390,293

Related U.S. Application Data

[63] Continuation-in-part of Ser. No. 186,400, Oct. 4, 1971, abandoned.

[52] U.S. Cl.................................... 260/326.11 R
[51] Int. Cl. ..................... C07d 27/36, C07d 27/38
[58] Field of Search ................ 260/326.11 R, 319.1

[56] References Cited
OTHER PUBLICATIONS

Sundberg, The Chemistry of Indoles, (1970), p. 161, (Academic Press., N.Y.).

Weissberger, (Ed.), The Chemistry of Organic Compounds, (Indole–Carbozole), (1954), p. 5, (InterScience Publ., N.Y.).

*Primary Examiner*—Elbert L. Roberts
*Attorney, Agent, or Firm*—John F. Stevens; Daniel B. Reece, III

[57] ABSTRACT

A process is disclosed for preparing Fischer's bases in a single step by reacting a ketone or aldehyde with phenylhydrazine and a polyphosphate ester prepared from phosphoric anhydride and an alcohol having from 1 to 5 carbon atoms.

5 Claims, No Drawings

PROCESS FOR PREPARING FISCHER'S BASE

This is a continuation-in-part application of U.S. Ser. No. 186,400, filed Oct. 4, 1971 and now abandoned.

This invention relates to a process for preparing Fischer's bases in a single step by reacting an aliphatic ketone or aldehyde, phenylhydrazine and a polyphosphate ester.

It is well known in the art that ketones may be reacted with phenylhydrazines to yield phenylhydrazones. It is further known that these phenylhydrazones may be reacted with polyphosphate esters to yield indoles. By the process according to this invention, however, there is provided a process for producing Fischer's bases in a single step from ketones or aldehydes, phenylhydrazones and polyphosphate esters. This single step synthesis of Fischer's bases is of considerable importance in the interest of time and economy in carrying out the process.

Fischer's bases are well known in the art, and are useful in such applications as intermediates for synthesis of cyanine dyes and photochromic compositions. For example, Fischer's bases may be condensed with an aromatic aldehyde to form methine-type dyes, such as the Astrazones (*Organic Chemistry*, Third Edition, by Fieser and Fieser, Reinhold Publishing Corporation).

Accordingly, it is an object of this invention to provide a new and useful process for the production of Fischer's bases and derivatives of Fischer's bases by the single step of reacting ketone or aldehyde with phenylhydrazine or substituted phenylhydrazine and a polyphosphate ester.

The reactions according to the present invention, in which an aldehyde or ketone is reacted with phenylhydrazine and a polyphosphate ester to form a Fischer's base, may be illustrated by the following general formula:

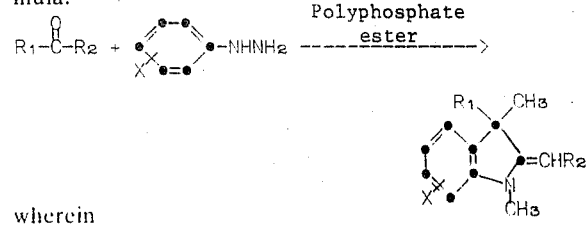

wherein $R_1$ is an alkyl radical containing from one to four carbon atoms;

$R_2$ is H or an alkyl radical containing from one to four carbon atoms; and

X is H or a substituent such as 2- or 4-alkyl, alkoxy or alkylthio having from one to 18 carbon atoms, 2- or 4-F, Br, Cl, $NO_2$, $CO_2CH_2CH_3$, CN, $CF_3$, $SO_2NH_2$, NHCOR, $SO_2CF_3$, $SO_2CHF_2$ or $SO_2R$ wherein R is alkyl or aryl having from one to 12 carbon atoms.

The ketones, aldehydes and phenylhydrazines which are useful in this invention are well-known compounds and are either available commercially or readily prepared by well-known procedures. If desired, alicyclic ketones may be used rather than aliphatic ketones, although it is preferred, for reasons of economy and simplicity, to use aliphatic ketones or aldehydes as a reactant. See for example, *Chemistry of Organic Compounds*, 3rd Edition by Noller, page 544 for a general method for the production of phenylhydrazine.

The polyphosphate esters useful in this invention may be easily prepared from phosphoric anhydride ($P_4O_{10}$) and an alcohol having from one to five carbon atoms, preferably methanol or ethanol. One suitable method for preparing these polyphosphate esters is to add the alcohol (1 mole) drop-wise to a suspension of $P_4O_{10}$ (0.25 mole) in $CHCl_3$ (100 g.) The mixture is stirred and cooled for 1 hour, keeping the temperature below 30° C. When stirred for an additional hour at room temperature, an almost clear solution is obtained. Using methyl alcohol, the reaction mixture separates into two layers as the product does not dissolve in $CHCl_3$. The upper layer is decanted off and the remaining layer is decanted from a small amount of unreacted $P_4O_{10}$, and to remove dissolved $CHCl_3$, evaporated at reduced pressure at room temperature to leave the polyphosphate esters as a colorless viscous syrup. When ethyl alcohol is used, a homogeneous solution is obtained which may be decanted and evaporated. Further purification is not necessary.

The process according to this invention is practiced generally by mixing one to 10 parts by weight of polyphosphate ester composition with one part by weight of, preferably, equimolar quantities of ketone or aldehyde and phenylhydrazine prepared as a solution in preferably the same alcohol from which the polyphosphate ester is prepared. Although it is stated herein in several instances that, preferably, equimolar quantities of ketone or aldehyde and phenylhydrazine are used, in some cases an excess of ketone or aldehyde can be tolerated. It is, however, preferred that essentially equimolar quantities of these reactants be used. Alternatively, one to 10 parts by weight of polyphosphate ester composition may be mixed with one part by weight of the neat phenylhydrazone derived from the ketone or aldehyde and phenylhydrazine. Another manner of carrying out the process is to mix one to 10 parts by weight of polyphosphate ester with one part by weight of the phenylhydrazone generated in situ in preferably the same alcohol from which the polyphosphate ester is derived. Also, one to 10 parts by weight of polyphosphate ester may be mixed with one part by weight of, preferably, equimolar quantities of neat ketone or aldehyde and phenylhydrazine added separately to the polyphosphate ester, either in sequence or simultaneously. Upon mixing the components, and after an initial exothermic reaction has subsided, the mixture is then heated to a reaction temperature of between about 160° C. and 200° C., at atmospheric pressure with removal of volatile solvents, if necessary, to give a homogeneous solution at the selected reaction temperature. It is essential that a homogeneous solution be produced at the reaction temperature. It may be desirable in some instances to use smaller amounts of polyphosphate ester within the stated range for purposes of economy. The temperature is held between 160° C. and 200° C. until formation of the Fischer's base is complete, resulting in a clear, amber solution. The Fischer's base in the solution is actually stabilized in ionic form, i.e., I. 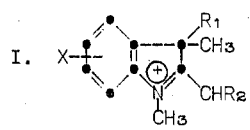

wherein $R_1$, $R_2$, and X are as described hereinbefore. At this point, the Fischer's base may be isolated and extracted, or the next reagent for producing the end product, such as cyanine dye or photochromic composition, may be added without isolating and extracting the Fischer's base. If it is desired to isolate and extract the Fischer's base at this point, the solution is cooled, preferably by pouring onto ice water, and stirred. The Fischer's base separates as an oil as the acidic solution is neutralized to a pH of at least 8; and it is isolated by conventional procedures, such as by extraction with a suitable organic solvent. The Fischer's base is sufficiently pure in this stage for many purposes, but if a higher degree of purity is desired, it may be distilled under reduced pressure or purified by conversion to a suitable quaternary salt (such as the hydroiodide) in the usual manner.

The following examples are included for a better understanding of the invention.

EXAMPLE 1

Ten parts by weight polyphosphate ester, prepared with methyl alcohol substantially in accordance with the method hereinbefore described, is stirred vigorously at room temperature under an inert atmosphere of nitrogen. Equimolar quantities of liquid methyl ethyl ketone and phenylhydrazine, in quantities amounting to two parts by weight, are added dropwise simultaneously at room temperature. The mixture is heated at 180° C. For 4 hours and the resulting deep amber solution is poured into cold water and stirred until a clear aqueous acidic solution is formed. The solution is neutralized to pH of 8, and a product is separated and isolated by extraction with methylene chloride solvent. This product is sufficiently pure for use in the preparation of cyanine dyes and photochromic compositions. The Fischer's base formed has the following structural formula:

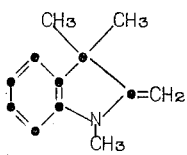

EXAMPLE 2

The same procedure is followed as in Example 1 except as follows: Methyl propyl ketone is used as the reactant; the ketone and phenylhydrazine are mixed in the same alcohol as was used to make the polyphosphate ester; the temperature is held at 175° C. for 4 hours and the Fischer's base product formed has the following structural formula:

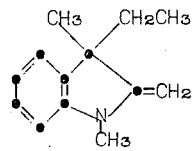

EXAMPLE 3

Three parts by weight of polyphosphate ester, prepared substantially in accordance with the method hereinbefore described, is stirred vigorously at room temperature under an inert atmosphere of dry nitrogen. Equimolar quantities of liquid isobutyraldehyde and phenylhydrazine, in a combined quantity equal to one part by weight, are added drop-wise simultaneously at room temperature. The mixture is heated at 180° C. for 12 hours and the resulting deep amber solution is poured into cold water and stirred until a clear aqueous acidic solution is formed. The solution is neutralized to a pH of 8, and a product is separated and isolated by extraction with methylene chloride solvent. This product is sufficiently pure for use in the preparation of cyanine dyes and photochromic compositions. The Fischer's base has the same structural formula as that of Example 1.

EXAMPLE 4

The same procedure is followed as in Example 3 except as follows: Methyl ethyl ketone is used as a reactant; the ketone and a substituted phenylhydrazine are mixed in the same alcohol as which the polyphosphate ester is derived; eight parts by weight of the polyphosphate ester are used to one part by weight of combined ketone and substituted phenylhydrazine; the temperature is held at 198° C. for 8 hours and a Fischer's base is formed according to the following reaction:

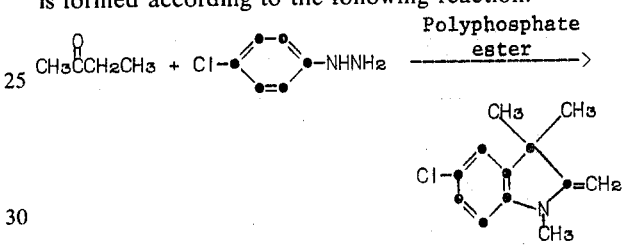

EXAMPLE 5

The same procedure is followed as in Example 3 except as follows: Methyl ethyl ketone is used as a reactant; the ketone and a substituted phenylhydrazine are mixed in the same alcohol as which the polyphosphate ester is derived; five parts by weight of a polyphosphate ester reaction mixture (prepared as described hereinabove) are used to one part by weight of combined ketone and substituted phenylhydrazine; the temperature is held at 185° C. for 12 hours; a Fischer's base is formed according to the following reaction:

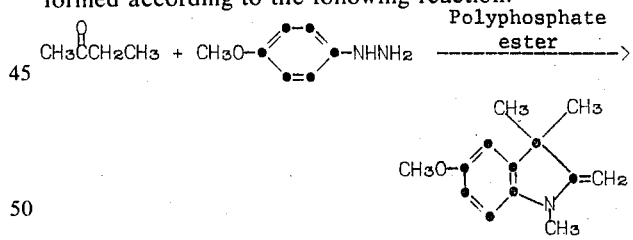

EXAMPLE 6

One mole phenylhydrazine is treated with one mole of 2-butanone with cooling and stirring. The resulting mixture (one part by weight) is added to 10 parts polyphosphate ester composition (freshly prepared from $P_4O_{10}$ and methanol) under an oxygen-free atmosphere with stirring, heated at 90° C. for 30 minutes, and finally at 180° C. for 3 hours. The pale yellow solution is cooled below 100° C. and poured under an oxygen-free atmosphere onto ice water previously degassed with pure argon. The resulting solution is neutralized with $K_2CO_3$ to pH 8.5 and extracted with diethyl ether (or methylene chloride). The extracts are combined, dried and evaporated to leave an amber oil which is found, by NMR analysis, to represent a 95° isolated yield of Fischer's base, i.e.,

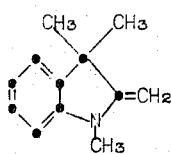

When the Fischer's base is not isolated, i.e., where the clear amber solution containing the Fischer's base cation is used, it is reacted in the same manner as the isolated Fischer's base. A mineral acid such as sulfuric, phosphoric, etc., may be added to the mixture to hasten the reaction. The following Example 7 illustrates use of the clear amber solution containing Fischer's base cation.

EXAMPLE 7

A suspension of 710 g. (5mols) phosphorous pentoxide in one liter of 1,2-dichloroethane in a 5 l. flask is treated dropwise with 320 g. (10 mols) of methanol over a 1-hour period. After approximately one-half of the methanol has been added, a thick paste forms which, however, is stirrable. After stirring overnight, the reaction mixture is distilled under reduced pressure on a steam bath to remove 1,2-dichloroethane. The clear viscous polymer residue is stirred at 85° C. and treated with 108 g. (1 mol) phenylhydrazine and 72 g. (1 mol) methyl ethyl ketone added dropwise simultaneously over a 15-minute period. A steady exotherm takes place during the addition and the temperature after addition is 125° C. The amber solution is then heated to 180° C. for 4 hours. The orange solution is cooled to 30° C. at which point it becomes quite viscous. This composition contains 1 mol of Fischer's base stabilized as a cation, i.e.,

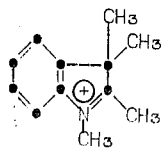

The material is quite stable toward heat, light, and autooxidation. Isopropanol (2.25 l.) is added and the mixture is stirred for 5 minutes. 4-[N-(2-Cyanoethyl)-N-(2-succinimidoethyl)amino]-2-methylbenzaldehyde, 313.4 g. (1 mol) is added followed by dropwise addition of 2 mols of sulfuric acid at 40° C. over a 15-minute period. The mixture is heated on the steam bath at reflux for 1.5 hour. The red solution is allowed to stand over a weekend and mixed with 11 l. of water. 612 G. of sodium chloride and 600 ml. water are added and steam passed into the suspension until all the solids dissolve. The heat is removed and stirring continued for 8 hours. Filtration gives 429 g. crude dye cake which is shown to consist of about 70–80 percent of a compound having the formula wherein R = $CH_3$, R' = $CH_2CH_2CN$,

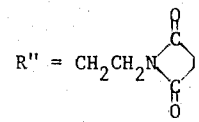

and about 20–30 percent unreacted 4-[N-(2-cyanoethyl)-N-(2-succinimdoethyl)-amino]-2-methylbenzaldehyde. The filtrate is shown to contain a mixture of starting materials, but mainly Fischer's base.

The invention has been described in considerable detail with particular reference to certain preferred embodiments thereof, but it will be understood that variations and modifications can be effected within the spirit and scope of the invention.

I claim:

1. A method of preparing Fischer's base which comprises the steps of:
   mixing one to 10 parts by weight of a polyphosphate ester prepared from $P_4O_{10}$ and an alcohol having one to five carbon atoms with one part by weight of substantially equimolar quantities of a composition having the general formula:

and a composition having the general formula:

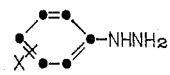

heating said mixture to a temperature of between 160° C. and 200° C. at atmospheric pressure to render a homogeneous solution which includes Fischer's base,
   wherein $R_1$ is an alkyl radical containing from one to four carbon atoms; $R_2$ is H or an alkyl radical containing from one to four carbon atoms; and X is H, 2- or 4-alkyl, alkoxy or alkylthio having from one to 18 carbon atoms, or 2- or 4-F, Br, Cl $NO_2$, $CO_2CH_2CH_3$, CN, $SO_2R$ wherein R is alkyl or aryl having one to 12 carbon atoms, $SO_2CF_3$, $SO_2CHF_2$, $CF_3$ or $SO_2NH_2$.

2. A method according to claim 1 which includes the additional steps of cooling said solution and neutralizing said solution to a pH of about 8.

3. A method according to claim 1 wherein the polyphosphate ester is prepared from an alcohol having from one to two carbon atoms.

4. A composition produced by the process which comprises the steps of:
   mixing one to 10 parts by weight of a polyphosphate ester prepared from $P_4O_{10}$ and an alcohol having one to five carbon atoms with one part by weight of substantially equimolar quantities of a composition having the general formula:

and a composition having the general formula:

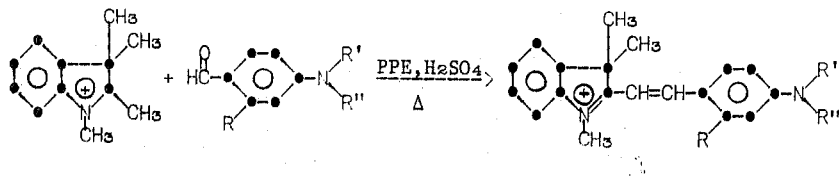

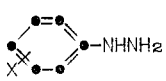

heating said mixture to a temperature of between 160° C. and 200° C. at atmospheric pressure to render a homogeneous solution, wherein $R_1$ is an alkyl radical containing from one to four carbon atoms; $R_2$ is H or an alkyl radical containing from 1 to 4 carbon atoms; and X is H, 2- or 4-alkyl, alkoxy or alkylthio having from one to 18 carbon atoms, or 2- or 4-F, Br, Cl, $NO_2$, $CO_2CH_2CH_3$, CN, $SO_2R$ wherein R is alkyl or aryl having one to 12 carbon atoms, $SO_2CF_3$, $SO_2CHF_2$, $CF_3$ or $SO_2NH_2$.

5. A composition produced by the process which comprises the steps of:

mixing five to 10 parts by weight of a polyphosphate ester prepared from $P_4O_{10}$ and methanol with one part by weight of substantially equimolar quantities of a composition having the general formula:

and a composition having the general formula:

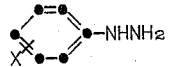

heating said mixture to a temperature of between 160° C. and 200° C. at atmospheric pressure to render a homogeneous solution, wherein $R_1$ is an alkyl radical containing from one to four carbon atoms; $R_2$ is H or an alkyl radical containing from one to four carbon atoms; and X is H, 2- or 4-alkyl, alkoxy or alkylthio having from one to 18 carbon atoms, or 2- or 4-F, Br, Cl, $NO_2$, $CO_2CH_2CH_3$, CN, $SO_2R$ wherein R is alkyl or aryl having one to 12 carbon atoms, $SO_2CF_3$, $SO_2CHF_2$, $CF_3$ or $SO_2NH_2$.

* * * * *